Feb. 16, 1943.  C. W. CALDWELL  2,311,208
HAND-BRAKE LEVER
Filed Sept. 8, 1941  2 Sheets-Sheet 2
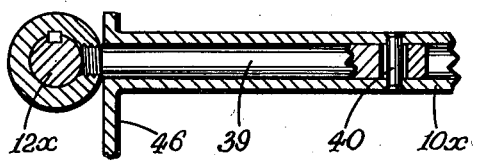
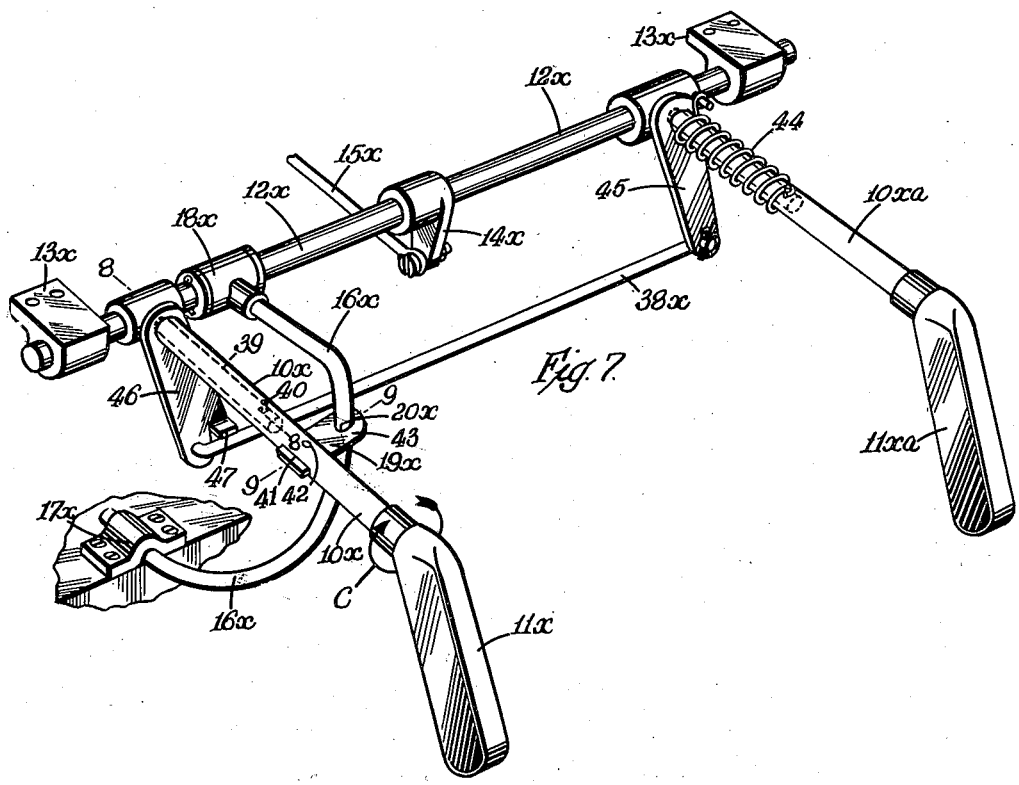
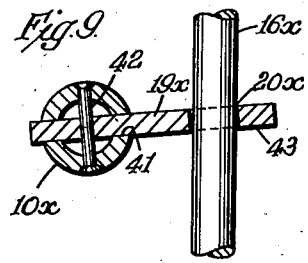
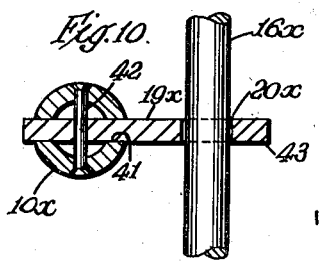
INVENTOR
CHARLES WILLIAM CALDWELL
By Young, Emery + Thompson
ATTYS.

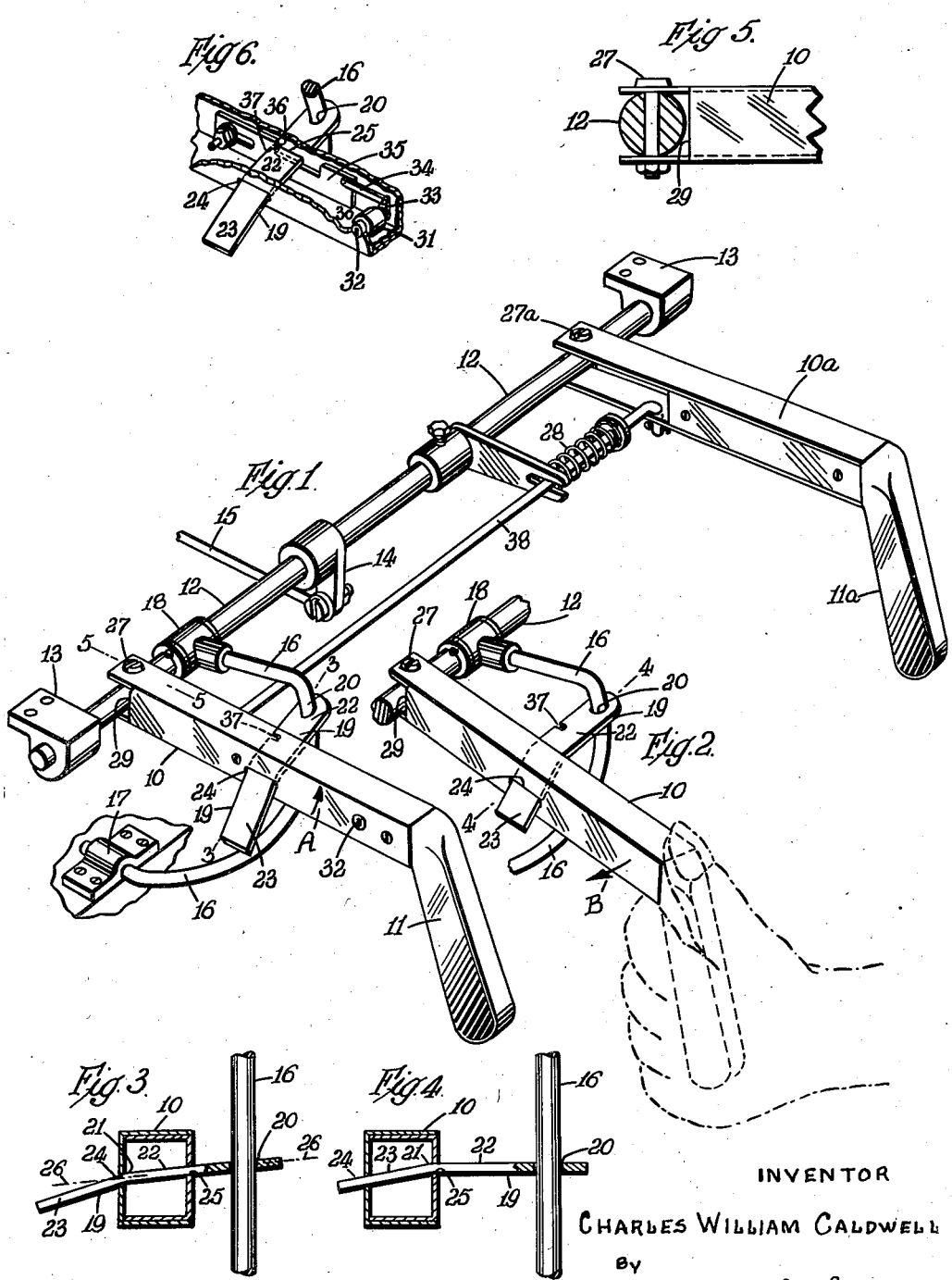

Patented Feb. 16, 1943

2,311,208

UNITED STATES PATENT OFFICE 2,311,208

HAND-BRAKE LEVER

Charles William Caldwell, Johannesburg, Transvaal, Union of South Africa

Application September 8, 1941, Serial No. 410,107

6 Claims. (Cl. 74—479)

This invention has reference to hand levers for operating the hand brake of a motor vehicle.

An object of the invention is to provide such a hand brake with a detent that is available in all positions of the lever to detain the lever against brake releasing movement. Another object is to provide a detent device that is more easily released than those of the ratchet and pawl type which usually require an additional pulling up movement before the pawl can be freed from the somewhat overhanging ratchet teeth. Another object is to facilitate the provision of a duplicate brake operating lever.

The invention is illustrated in the accompanying drawings in which:

Figure 1 is a perspective view of one form of the invention showing the hand brake lever detained in the brake-on position.

Figure 2 shows the hand lever still pulled up but unlocked and ready for downward movement to release the brake.

Figure 3 is an enlarged section on 3—3. Fig. 1.

Figure 4 is a similar section on 4—4, Fig. 2.

Figure 5 is an enlarged section on 5—5, Fig. 1.

Figure 6 is a detail view showing the hand lever broken open to exhibit a lock.

Figure 7 is a perspective view of another form of the invention with the hand lever detained in the brake-on position.

Figure 8 is an enlarged longitudinal section of the brake lever arm taken on 8—8, Fig. 7.

Figure 9 is an enlarged horizontal section on 9—9, Fig. 7.

Figure 10 is similar to Fig. 9, but shows the detent device released.

10 indicates the hand lever of a car hand brake terminating in a hand grip 11. Said lever is so mounted on shaft 12 that said lever and shaft rotate rigidly together about the axis of the shaft. The shaft is free to rotate in fixed bearings 13 and has rigidly mounted on it an arm 14 which operates the brake mechanism. The latter is represented, as far as is necessary for this invention, by the rod 15. By pulling the lever 10 up in the direction indicated by the arrow A, the rod 15 is moved under tension to apply the brakes; and, correspondingly, the brakes are released by relaxing movement of rod 15 due to swinging the lever 10 down in the direction opposite to that of arrow A.

In order to hold the brake on, means are provided whereby the lever 10 is detained in the position to which it has been pulled in applying the brakes. This position varies from time to time as the brake linings wear away; and it is a desirable feature of the detent means that it should be ready to lock the lever in any such position and with little or no slacking back movement of the lever. With this object the detent means provided according to the invention comprises a fixed quadrant 16 co-axial with the lever 10 and shaft 12. The quadrant is made of such cross-sectional form that it can be embraced on two opposite sides by a detent member gapped to admit it; and in the example shown it is made of smooth round rod, bent to shape. One end of the rod is secured at 17 to a fixed point of the car body; the other end being anchored by a stationary sleeve 18 supported by the shaft 12.

The lever 10 carries a detent member 19 shown as a tongue of flat metal, projecting laterally from the lever 10 and formed with an eye 20 embracing the quadrant rod 16. It is well known that in such a rod and tongue combination the tongue will slide freely along the rod so long as it remains substantially perpendicular to the latter; but will lock on the rod when allowed or caused to tilt about its eye. This property is made use of according to the invention by holding the tongue 19 perpendicular to the quadrant rod 16 when free movement of the hand lever 10 is desired, and tilting it relatively to the rod to lock said lever.

For this purpose, in the Figure 1 to 6 construction, the tongue is bent at 21 to form two end portions 22 and 23 inclined to one another. The portion of the lever 10 with which the tongue is engaged is made of hollow section, with its opposite side walls formed with slots 24, 25 in which the tongue is an easy fit to slide in the direction of its length and laterally to the lever 10. The centre line 26 of these slots is at an inclination to the horizontal equal to the supplement of the angle included between the portions 22 and 23 of the tongue. Consequently upon the tongue being slid endwise, so that its end portion 23 is seated in the slots, as shown in Figs. 2 and 4, its end portion 22 is firmly held in a horizontal position and perpendicular to the rod 16; so that it cannot lock with the latter. On the other hand upon its being slid in the opposite direction so that a portion of both ends or only the end portion 22 is engaged in the slots, as shown in Figs. 1, 3 and 6, said portion 22 is tilted at an inclination to the rod 16 which permits or causes its eye to lock with said rod. This inclination being upward, it tends to be increased by the downward drag of the lever 10 so that the tongue is operative to lock said lever 10 when the brakes are on; and the locking grip is the more intense the greater the tension of the rod.

To provide for the above-described relative sliding of the tongue in the lever 10, the latter is secured to the shaft 12 by a pivot joint, including the pivot pin 27 at right angles to the length of lever 10, that rigidly connects the lever and shaft as far as rotational movement is concerned but permits the lever to swing, within limits, at right angles to such rotational movement and so towards and away as indicated by arrow B, Fig. 2, from the quadrant 16. When the lever is nearest to the quadrant, it retains the tongue in its tilted locking position as shown in Figs. 1, 3 and 6, and when it is most distant from the quadrant it holds the tongue horizontal as in Figs. 2 and 4. The lever is normally held in the first-mentioned position by the spring 28; its approach to the quadrant being limited by the slope of 22 after the eye 20 has gripped the quadrant rod 16. Its movement to the left is limited by the stop edge 29 of the lever coming into contact with shaft 12.

Accordingly in order to release the lever 10 and the brakes, the lever 10 is manually moved to the left in the drawing, and held in that position while being swung down to its brake-off position. The lever may also be moved to and held at its left-hand position while being pulled up to apply the brakes and then while being held against downward releasing movement, be moved to the right to cause it to lock.

It will be seen that the right-handed pivotal movement of the lever 10, after it has been pulled up in the A direction to the position at which the brakes are properly on, forcibly tilts the tongue into locking engagement with the quadrant; consequently the slacking back movement of the lever 10 upon its becoming locked, is negligible.

Means are provided for locking the tongue against sliding movement when it is in its quadrant gripping position, so as to lock the car against unauthorized removal. A key lock 30 is fitted within the hollow portion of the lever 10. Its rotating barrel 31 presents the key slot 32 at the outside of the lever and is connected by the crank 33 and link 34 to the sliding plate 35. The latter provides the edge 36 which, by rotation of the barrel 31, enters the mouth 37 in the side of tongue 19 and so secured the latter in its tilted up position.

The regular hand brake lever 10 is usually positioned at the left-hand of the driver; and it is sometimes desirable to provide an additional such lever positioned at the driver's right so as to be readily accessible to a person sitting beside the driver. An additional hand lever of this kind and indicated by 10$^a$ is inexpensively provided according to the invention by connecting it to the similarly extended shaft 12 by the pivot joint 27$^a$ similar to joint 27 and by connecting both levers by a parallel motion link 38. The shaft connection ensures that both levers swing up and down together and the link connection ensures that they swing horizontally together, so that all their movements are identical. The putting on and release of the brakes and the clutching or release of the detent can thus be accomplished with either lever 10 or 10$^a$ without interference from the other.

Referring to Figs. 7 to 10 the brake hand lever comprises a tubular handle shaft 10$^x$ mounted on the arm 39 so as to be rigid with the latter except that it can rotate thereon about their common axis. A cross pin 40 holds said parts against longitudinal separation, but allows the small extent of rotational play necessary for this form of the invention. The outer end of the tubular body is formed as or has rigidly mounted on it, the hand grip 11$^x$. The arm 39 extends rigidly from the shaft 12$^x$. The detent tongue 19$^x$ is in this case passed through a transverse slot 41 in the arm 10$^x$ and is rigidly secured there by a rivet 42. As in the prior example said tongue 19$^x$ is formed at its free end 43 as an eye 20 surrounding the quadrant 16$^x$ and slightly exceeding the latter in diameter.

The second hand lever indicated by 10$^{xa}$, is of the same construction as the hand lever 10$^x$. Mounted on it is the twisting spring 44 tending always to rotate its tubular handle shaft 10$^{xa}$ anti-clockwise and so—acting through crank lever 45 the coupling rod 38$^x$ and the crank lever 46—tending to rotate the tubular handle shaft 10$^x$ in the same direction and thereby to tilt the detent tongue angularly to the quadrant 16$^x$ as shown in Figs. 7 and 9. However by manual rotation of the assembly 10$^x$, 11$^x$ or 10$^{xa}$, 11$^{xa}$, in the clockwise direction as indicated by the arrow C, the detent tongue 19$^x$ can be brought perpendicular to the quadrant as shown in Fig. 10; rotation beyond this point being prevented by the stop 47 on the crank lever 46 coming into contact with the coupling rod 38$^x$.

When pulling up the hand lever 10$^x$ or 10$^{xa}$ to apply the brake, it is convenient to hold the hand grip 11$^x$ or 11$^{xa}$ in the position in which the detent tongue 19$^x$ is square with the quadrant as shown in Fig. 10. Upon the hand lever being pulled up to the desired extent, it is rotated or allowed to rotate under the influence of the spring 44 so that the detent tongue 19$^x$ tilts to the Figs. 7 and 9 position. The eye 20$^x$ thereupon locks with the quadrant against the tendency of the lever arm to return by reason of the tension of the rod 38$^x$ and the greater this returning tendency the more effective is the lock. As the result the brake is held on until the hand grip is again purposely rotated in the C direction.

I claim:

1. The combination of a hand brake lever pivoted to rotate about an axis transverse to its length, a fixed quadrant co-axial with the lever about said axis, said lever also being rotatable about its own lengthwise axis, means extending laterally from the lever to engage with the quadrant or disengage therefrom according to its angularity thereto, said angularity being varied by the rotation of the lever about its own axis.

2. The subject matter of claim 1, in which the laterally extending means consists of a tongue rigid with the lever and gapped to embrace the quadrant, the rotation of the lever about its lengthwise axis to release itself from the quadrant bringing the gap perpendicular to the length of the quadrant.

3. The subject matter of claim 1 comprising spring means tending to rotate the lever about its own axis in the direction causing the means to engage with the quadrant.

4. The subject matter of claim 1, in which the lever terminates in a hand grip cranked from the lengthwise axis of the lever.

5. The combination with a brake actuating lever mounted to be capable of movement simultaneously in at least two mutually perpendicular directions, of a second brake actuating lever similarly mounted, means connecting the levers to keep them parallel with one another in both of said directions, brake actuating mechanism controlled by movement of the levers in one of said directions and lever detent mechanism controlled by movement of the levers in the other of said directions.

6. The combination of a shaft mounted to rock about its axis, two hand levers rigid with the shaft as regards the rocking movement of the latter, and arranged with their axes parallel with one another and perpendicular to the shaft axis, each lever being further rotatable about its own lengthwise axis, means connecting the levers to synchronize their rotation, brake actuating means operated by the rocking of the shaft and brake detent means operated by the lever rotational movement.

CHARLES WILLIAM CALDWELL.